United States Patent [19]
Reynolds

[11] Patent Number: 5,092,439
[45] Date of Patent: Mar. 3, 1992

[54] SYNCHRONIZER WITH DEEP SPLINES & IMPROVED BOOST RAMPS

[75] Inventor: Joseph D. Reynolds, Climax, Mich.

[73] Assignee: Eaton Corporation, Cleveland, Ohio

[21] Appl. No.: 633,743

[22] Filed: Dec. 24, 1990

[51] Int. Cl.⁵ .............................................. F16D 23/06
[52] U.S. Cl. ................................. 192/53 E; 192/53 F
[58] Field of Search ........................ 192/53 E, 53 F

[56] References Cited

U.S. PATENT DOCUMENTS

| | | | |
|---|---|---|---|
| 2,410,511 | 11/1946 | Letsinger et al. | 192/53 E |
| 2,896,760 | 7/1959 | Hebbinghaus | 192/53 E |
| 2,978,083 | 4/1961 | Henyon | 192/114 |
| 3,086,633 | 4/1963 | Winter | 192/53 F |
| 3,221,851 | 12/1965 | Vandervoort | 192/53 |
| 3,265,173 | 8/1966 | Russell | 192/67 |
| 3,548,983 | 12/1970 | Hiraiwa | 192/53 |
| 3,695,403 | 10/1972 | Eastwood | 192/53 F X |
| 3,804,218 | 4/1974 | Krutashov | 192/53 E |
| 3,910,390 | 10/1975 | Eichinger | 192/53 E |
| 4,018,319 | 4/1977 | Thomas | 192/53 E |
| 4,125,179 | 11/1978 | Cochran et al. | 192/53 E |
| 4,246,993 | 1/1981 | Morscheck | 192/53 F |
| 4,361,060 | 11/1982 | Smyth | 74/866 |
| 4,413,715 | 11/1983 | Michael et al. | 192/53 F |
| 4,425,820 | 1/1984 | Griesser | 192/53 F X |
| 4,427,447 | 1/1984 | Ramanarayanan | 75/252 |
| 4,428,469 | 1/1984 | Morscheck et al. | 192/53 E |
| 4,462,489 | 7/1984 | Morscheck | 192/53 E |
| 4,700,823 | 10/1987 | Winckler | 192/107 M |
| 4,778,548 | 10/1988 | Fox | 156/153 |
| 4,788,889 | 12/1988 | Davis | 74/745 |
| 4,836,348 | 6/1989 | Knödel et al. | 192/53 F |
| 4,844,218 | 7/1989 | Genise | 192/53 F |
| 4,869,353 | 9/1989 | Ohtusuki et al. | 192/53 F |

FOREIGN PATENT DOCUMENTS

| | | | |
|---|---|---|---|
| 870198 | 8/1943 | France | 192/53 |
| 53-27763 | 3/1978 | Japan | 192/53 E |
| 59-212535 | 12/1984 | Japan | 192/53 E |
| 255594 | 2/1949 | Switzerland | 192/53 |
| 727900 | 4/1980 | U.S.S.R. | 192/53 E |

*Primary Examiner*—Leslie A. Braun
*Assistant Examiner*—Andrea Pitts
*Attorney, Agent, or Firm*—P. S. Rulon

[57] ABSTRACT

A compound transmission (12) including main and auxiliary transmission sections (14,15) having several pin-type, double-acting, self-energizing synchronizer mechanisms (60,62,84). The several synchronizer mechanisms are configured to provide higher self-energizing forces for higher speed reduction ratio gears than for lower speed reduction gears, and to provide higher self-energizing forces for downshifts than for upshifts. The self-energizing forces are provided by improved self-energizing ramp surfaces (29e,29f,29g,29h and 111a,111b,111c,111d) formed in external splines 29 of a shaft 28 and in internal teeth extending radially inward from a shift flange 110. The shift flange carries improved pre-energizer and neutral centering assemblies (120) axially retained by end surfaces (102a,104a) of jaw clutch member (102,104).

12 Claims, 7 Drawing Sheets

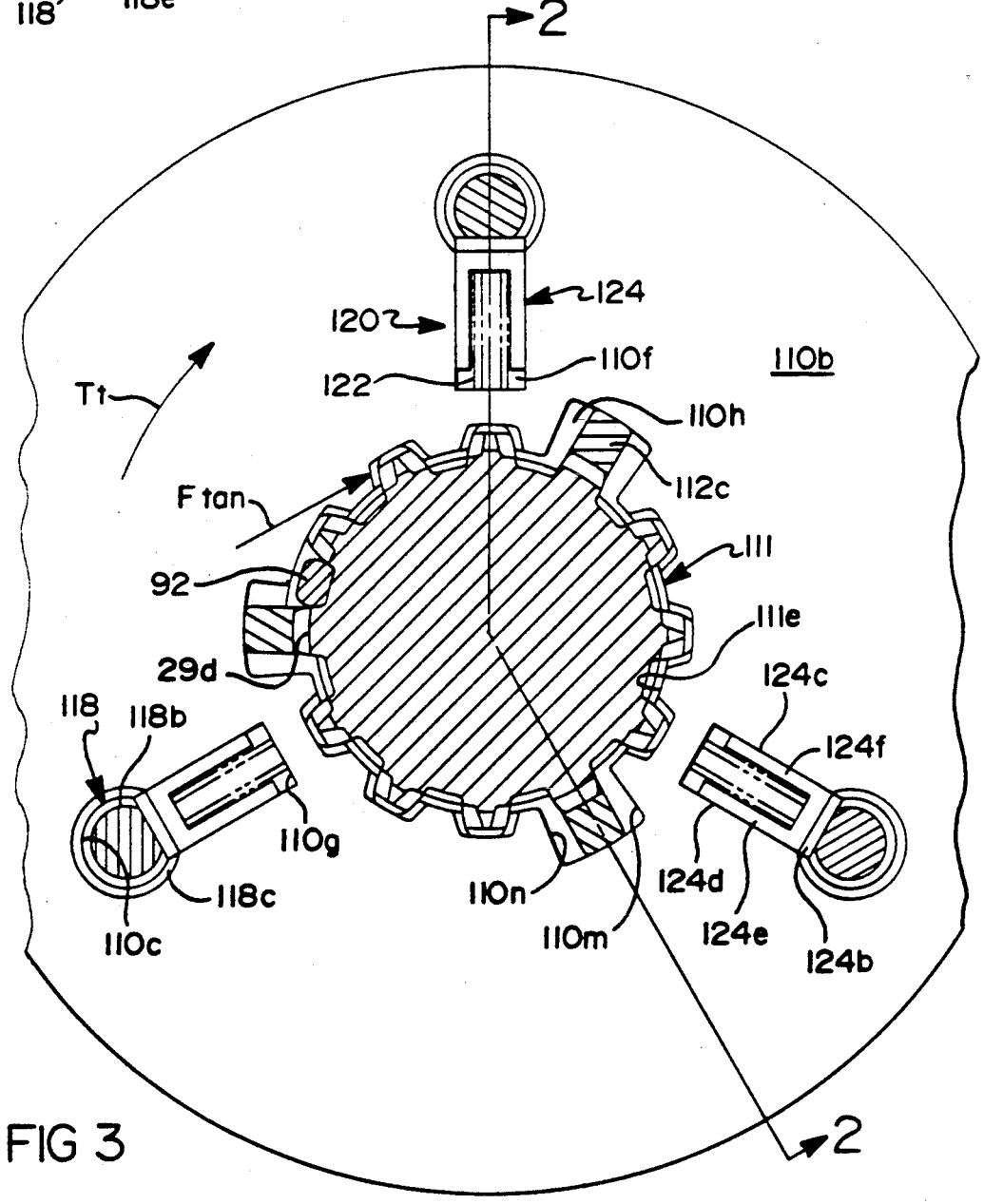

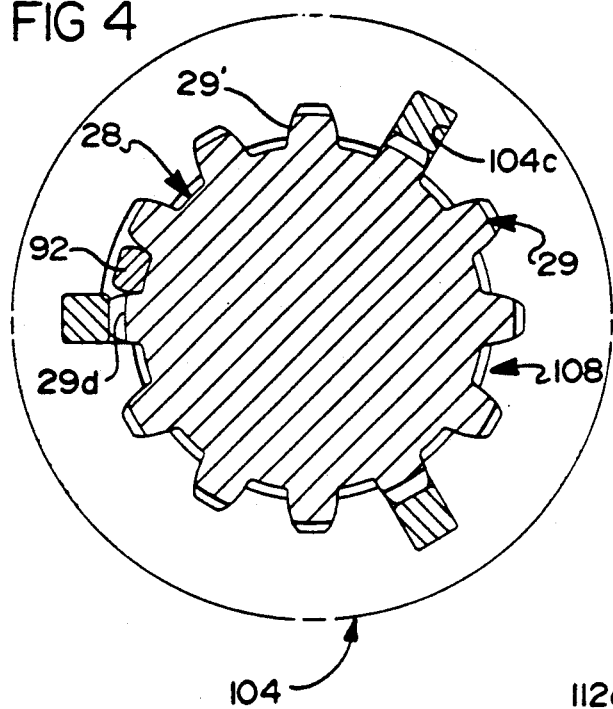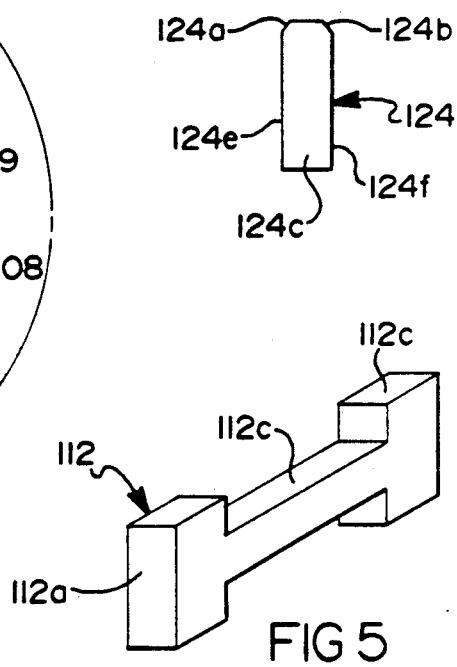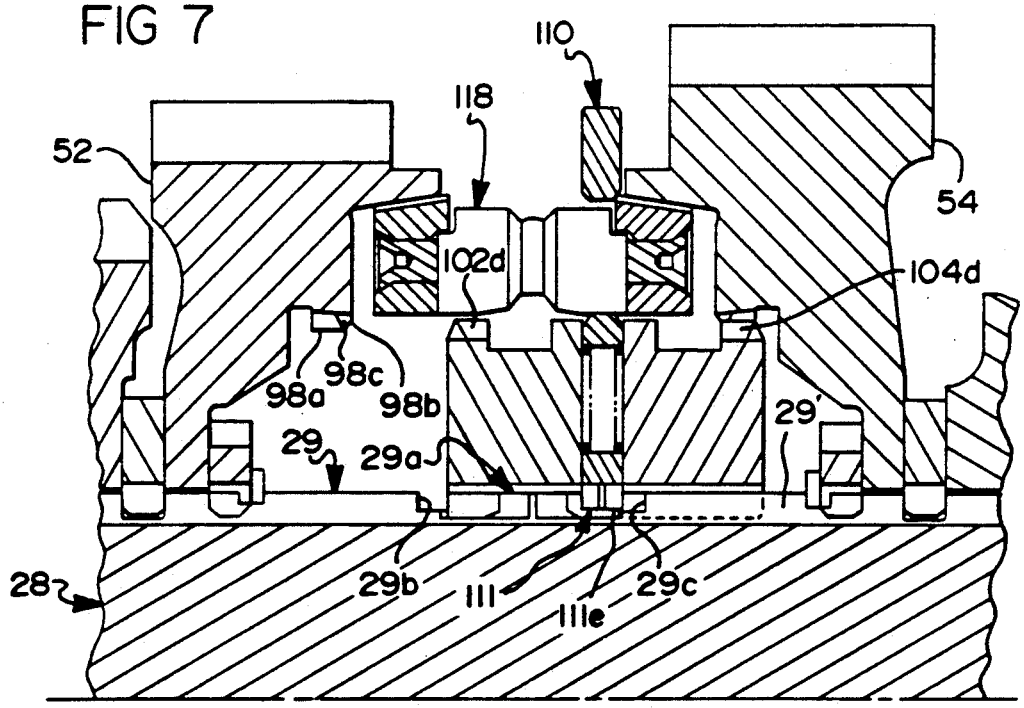

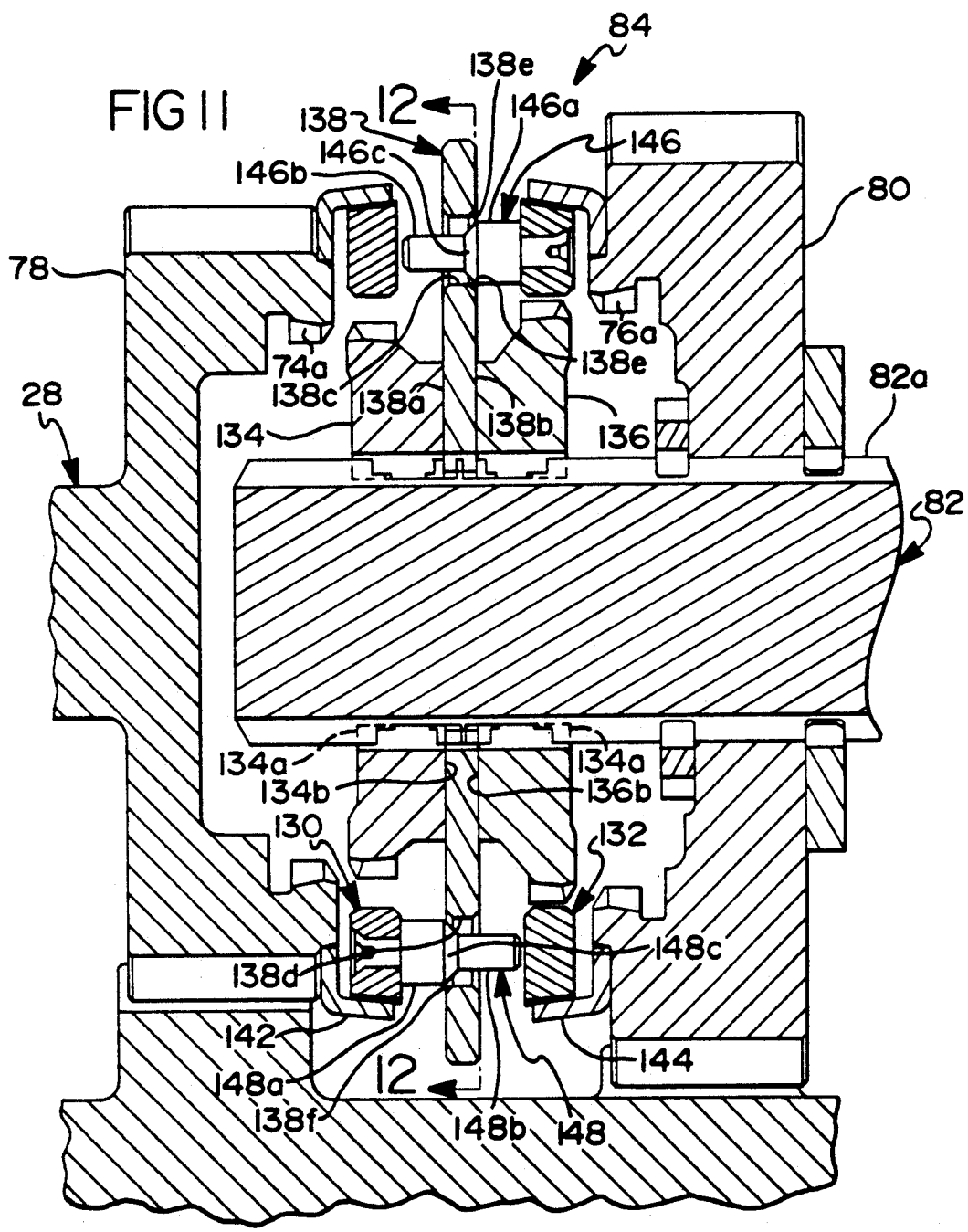

SYNCHRONIZER WITH DEEP SPLINES & IMPROVED BOOST RAMPS

CROSS-REFERENCE RELATED APPLICATIONS

This application is related to U.S. application Ser. Nos. 632,880, 632,881, 632,882, 632,883, 632,884, 633,703, 633,704, 633,738, 633,789, 633,744, all filed Dec. 24, 1990, all assigned to the assignee of this application, and all incorporated herein by reference.

1. Field of the Invention

This invention relates to self-energizing synchronizer mechanisms for a transmission. More specifically, the invention relates to such mechanisms employed with several ratio gears of a multi-ratio transmission for substantially equalizing shift time and effor of the several ratio gears.

2. Background of the Invention

It is well known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size, synchronizer mechanisms of the self-energizing type are especially important for heavy duty trucks. Prior art examples of such mechanisms may be seen by reference to U.S. Pat. Nos. 2,410,511; 2,896,760; 3,548,983; 4,413,715; 4,836,348; and 4,869,353 which are incorporated herein by reference.

The synchronizer mechanisms of the above patents include friction and jaw members for respectively synchronizing and positive clutching a gear to a shaft; blockers engaged in response to a pre-energizer effecting initial engagement of the friction members in response to initial engaging movement of one of the jaw members by a shift force, the blockers being operative to prevent asynchronous engagement of the jaw members and to transmit the shift force to the friction members to increase synchronizing torque thereof; and self-energizing ramps reacting the torque to provide an additional force in the direction of an additive to the shift force for further increasing the synchronizing torque of the friction members.

The structure of the synchronizer mechanisms in these patents differs substantially from the stucture of pin-type synchronizer mechanisms herein. Due, at least in part, to these structural differences, it has been difficult to provide pin-type synchronizer mechanisms with the self-energizing feature mentioned above.

Further, while the synchronizer mechanisms of these patents may well have reduced shift time and shift effort, they have not taken into account varying shift requirements for the whole transmission, i.e., lower speed ratio gears in general require more shift effort and/or time than do high gear speed ratios, and that down shifts in general require more effort and/or time than do upshifts.

SUMMARY OF THE INVENTION

An object of this invention is to provide self-energizing synchronizer for equalizing the shift time and effort of several ratios of a transmission.

According to a feature of the invention, a pin-type synchronizer mechanism, as disclosed in U.S. Pat. No. 4,462,489, the disclosure of which is hereby incorporated by reference, includes first friction and jaw means respectively engagable with second fricton and jaw means for respectively synchronizing and positive connecting a gear to a shaft in response to an axial shift force axially moving a radially extending flange. Connecting means are provided for effecting axial movement of the first jaw means in response to axial movement of the flange. The first jaw means has a plurality of internal spline teeth mating with external spline teeth affixed to the shaft. The external spline teeth each have a flank surface circumferentially spaced from and facing a flank surface of adjacent external spline teeth parallel to the shaft axis. Radially inner extents of the first jaw means define an inside diameter thereof. The mating spline teeth allow axial and prevent rotational movement of the first jaw means relative to the shaft. The second friction and jaw means are affixed to the gear. First and second blocker means are operative when engaged for preventing engagement of the jaw means prior to the synchronzing. The first blocker means are defined by a plurality of circumferentially spaced pin-like means rigidly extending axially from the first friction means and into openings in the flange. The second blocker means are defined about the openings. Pre-energizer means are provided to engage the friction means in response to initial axial movement of the flange by the shift force from a neutral position toward the gear, for engaging the blocker means in response to engagement of the friction means producing a synchronizing torque transmitted to the flange via the pin-like means, and for transmitting the shift force to the first friction means via the blocker means to increase the engaging force of the friction means.

The improvement is characterized by:
the connecting means for the flange and the first jaw means, and the flange including stop means for limiting circumferential movement of the flange relative to the first jaw means and the shaft;
first recesses in the shaft spline defining an annular groove, the recesses having a minimum outside diameter greater than the inside diameter of the internal spline teeth of the movable jaw means, a first common circumferentially facing flank surface of several of the shaft splines at one end of the recesses including first self-energizing ramp surfaces forming angles less than ninety degrees relative to a plane normal to the shaft axis; and
several reaction means extending radially inward from the flange and received in the spaces of the shaft splines at positions adjacent the first ramp surfaces, the reaction means having an inside diameter greater than the minimum outside diameter of the shaft spline recesses, the reaction means including second self-energizing ramp surfaces for mating engagement with the first ramp surfaces in response to synchronizing torque in at least one direction from the engaged friction means associated with the first gear to provide an axial additive force on the flange in a direction of the shift force for increasing the engaging force of the friction means.

BRIEF DESCRIPTION OF THE DRAWINGS

The synchronizer mechanism of the invention is shown in the accompanying drawings in which:

FIG. 3 is a partially sectioned view of the mechanism looking along line 3—3 of FIG. 2;

FIG. 4 is a sectional view of a portion of the mechanism looking along line 4—4 of FIG. 2;

FIG. 5 is a perspective view of a component in FIGS. 2 and 3;

FIGS. 6 and 6A are detailed views of a pin component and a plunger component in FIGS. 2 and 3;

FIG. 7 is a partial view of mechanism in FIG. 1 with a jaw clutch thereof in an engaged position;

FIG. 10 is a graphical representation of axial forces and torques acting on a shift flange of the synchronizer;

FIG. 11 is a sectional view of another double-acting self-energizing synchronizer mechanism looking along line 11—11 of FIG. 12;

FIG. 13 is a sectional view looking along line 13—13 of FIG. 12; and

DETAILED DESCRIPTION OF THE DRAWINGS

The term "compound transmission" is used to designate a change speed or change gear transmission having a main transmission section and an auxiliary transmission section connected in series whereby the selected gear reduction in the main transmission section may be compounded by further selected gear reduction in the auxiliary transmission section. The term "upshift" as used herein shall mean the shifting from a lower speed gear ratio to a higher speed gear ratio. The term "downshift" as used herein shall be the shifting from a higher speed gear ratio to a lower speed gear ratio. The term "low speed gear" or "low gear" as used herein shall designate a gear ratio utilized for relatively lower forward speed operation in a transmission, i.e., a set of gears having a higher ratio of reduction of the output shaft speed relative to the speed of the input shaft. "Synchronizer clutch mechanism" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate synchronizer clutch mechanism which includes ramps or cams or the like to increase the engaging force of the synchronizing clutch in proportion to the synchronizing torque of the friction clutch.

Figure 1:
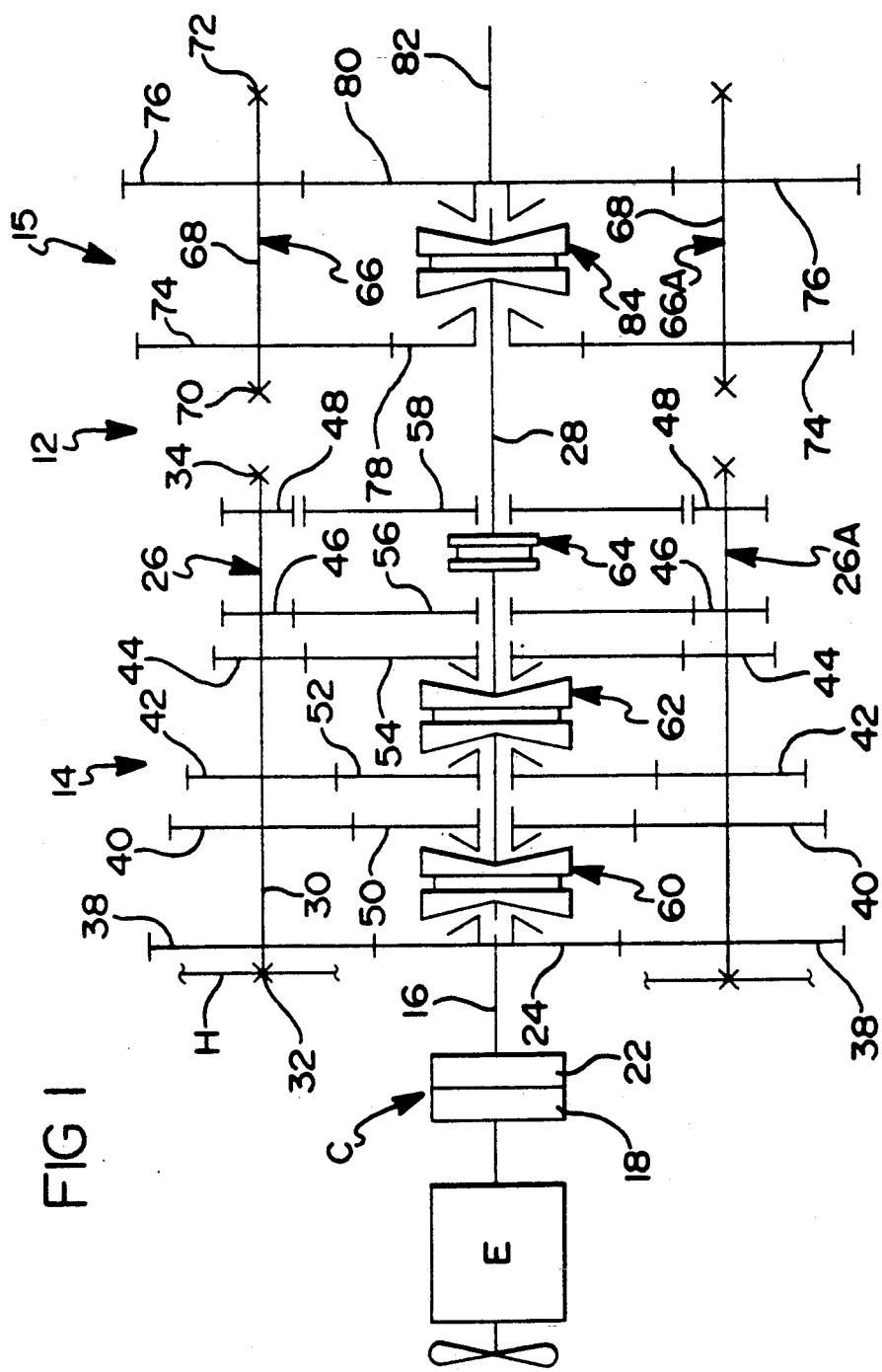
FIG. 1 is a schematic illustration of compound transmission having a range-type auxilliary section.

Referring now to FIG. 1, therein is schematically illustrated a compound transmission 11 comprising a main transmission section 14 connected in series with a range-type auxiliary section 15. Both sections are well known and of the twin countershaft type. It is understood that transmission 12 could comprise only the main transmission section 14, or other types of compound transmission wherein the auxiliary section is of the splitter or splitter/range-type. Such transmissions are disclosed in U.S. Pat. No. 4,788,889 which is incorporated herein by reference.

Typically, transmission 12 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In transmission 12, the input shaft carries, an input gear 24 for simultaneously driving a plurality of substantially identical countershaft assemblies 26,26A at substantially identical rotational speeds. In the transmission 12, the illustrated two countershaft assemblies 26,26A are provided on diametrically opposite sides of a mainshaft 28 which is generally co-axially aligned with the input shaft 16. Each of the countershaft assemblies 26,26A comprises a countershaft 30 supported at opposite ends be bearings 32,34 in housing H. Only portions of housing H are schematically illustrated. Each of the countershafts 30 is provided with an identical grouping of countershaft gears 38, 40, 42, 44, 46 and 48 fixed for rotation therewith. A plurality of drive or mainshaft gears 50, 52, 54, 56 and 58 surround the mainshaft 28 and are selectively clutchable, one at a time, to the mainshaft 28 for rotation therewith by sliding movement of self-energizing synchronizer clutch mechanisms 60,62 and clutch collar mechanism 64. Clutch mechanism 60 may be moved leftward to clutch input-gear 24 to mainshaft 28 to provide a direct drive relation between input shaft 16 and mainshaft 28.

Preferably, each mainshaft gear encircles the mainshaft 28 and is in continuous meshing engagement with and is floatingly supported by the associated countershaft gear group. Such mainshaft gear mounting and special advantages resulting therefrom is explained in greater detail in U.S. Pat. Nos. 3,105,395 and 3,335,616, the disclosures of which are incorporated herein by reference. Typically, clutch mechanisms 60,62 and 64 are axially positioned by means of shift forks (unshown) associated with shift bar housing assembly (unshown), as well known in the prior art. Clutch collar 64 is of the well known nonsynchronized double-acting jaw clutch type.

It is understood that although the present invention is illustrated in connection with transmissions of the well known twin countershaft, floating mainshaft and floating mainshaft gear type, the present invention is equally applicable to transmissions of the single countershaft type. Additionally, although the present invention is illustrated in and is advantageously utilized in connection with manually operated transmissions, the invention is also equally applicable to semi or fully automated mechanical transmissions of the types illustrated in U.S. Pat. Nos. 4,361,060 and 4,427,447.

Mainshaft gear 58 is the reverse gear and is in constant meshing engagement with countershaft gears 48 by means of a conventional intermediate idler gear (unshown). It should also be noted that while main transmission section 14 does provide five selectable forward speed ratios, the lowest forward speed ratio, namely, the ratio provided by drivingly connecting mainshaft gear 56 to the mainshaft 28, is often of such a high gear reduction as to be considered a low or creeper gear which is utilized only for starting a vehicle under severe conditions. If main transmission section 14 is utilized with an auxiliary transmission section, such as the two speed range section 15 herein, the low gear is not usually compounded. Hence, the transmission 12 herein provides nine forward speed ratios.

Auxiliary transmission section 15 includes two substantially identical auxiliary countershaft assemblies 66,66A, each comprising an auxiliary countershaft 68 supported at its opposite ends by bearings 70,72 in housing H and carrying two auxiliary section countershaft gears 74,76 fixed for rotation therewith. Auxiliary countershaft gears 74 are constantly meshed with and support a range gear 78 which surrounds mainshaft 28. Auxiliary countershaft gears 76 are constantly meshed with and support a range/output gear 80 which surrounds an output shaft 82 and is fixed for rotation therewith.

A sliding, double-acting, self-energizing synchronizer clutch mechanism 84 is fixed for rotation to mainshaft 28 and is utilized to selectively couple either the range gear 78 or the output gear 80 to the mainshaft 28. Clutch mechanism 84 utilizes much of the principles of double-acting, self-energizing synchronizer clutch mechanisms 60,62 and the principles of a one-way synchronizer clutch mechanism in previously mentioned co-pending application Ser. No. 07/633,739.

Transmission 12 is sequentially upshifted through the first five of its nine forward speed ratios by positioning range clutch mechanism 84 leftward to couple range gear 78 to mainshaft 28 and then shifting the main transmission section through its five forward speed ratios 56, 54, 52, 50, 16. Sequential shifting through the other four forward speed ratios is effected by positioning range clutch mechanism 84 rightward to couple mainshaft 28 directly to output gear 80 or output shaft 82 and then shifting the main transmission section through the four forward speed ratios 54, 52, 50, 16. Downshifting is merely the reverse of upshifting.

In the remainder of the detailed description, components and elements which correspond directly to the schematically illustrated components and elements in FIG. 1 will be given the same reference numbers.

Figure 2:
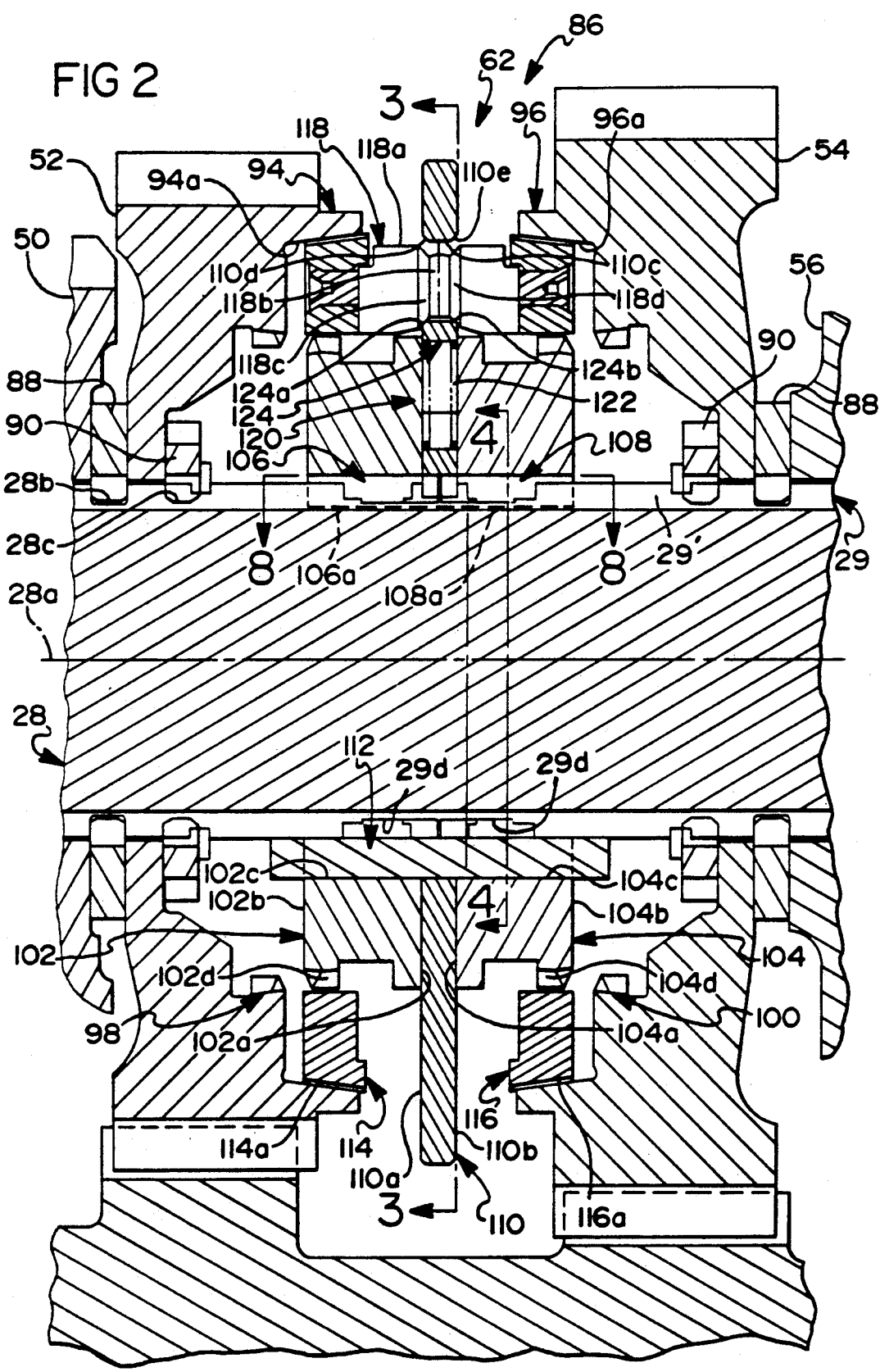
FIG. 2 is a sectional view of a double-acting synchronizer mechanism looking along line 2—2 of FIG. 3.

Looking now mainly at FIGS. 2 and 3, therein is shown in detail a gear and synchronizer assembly 86 including the shaft 28 mounted for rotation about a central axis 28a, the axially spaced apart gears 52,54 rotatably supported on the shaft and secured against axial movement relative to the shaft by annular thrust members 88,90 and the double-acting synchronizer clutch mechanism 62. Thrust members 88,90 are axially retained in annular grooves 28b,28c in spline teeth 29 of the shaft and are affixed against rotation relative to the shaft by a retainer pin 92 (FIG. 3) disposed in a space between two of the teeth 29.

The synchronizer mechanism 62 includes annular friction member portions 94,96 and jaw clutch member portions 98,100 integrally formed with gears 52,54 jaw clutch members 102,104 having internal spline teeth 106,108 slidably mating with the external spline teeth 29 integrally formed with shaft 28 or otherwise affixed thereto, a radially extending shift flange 110 having axially oppositely facing sides 110a, 110b sandwiched between axially facing surfaces 102a,104a of the jaw members 102,104 three H-shaped retainer members 112 (one of which is shown in perspective in FIG. 5) for securing the flange and jaw members against relative axial movement, annular friction members or rings 114,116 rigidly secured together by three circumferentially spaced apart pins 118 extending axially from each of the friction members and through openings 110c in the flange, and three pre-energizer and neutral centering assemblies 120 each including a spring 122 and a plunger 124 which reacts with surfaces defined by the pins. Alternatively, synchronizer mechanism 62 maybe of the single-acting, pin-type, i.e., configured to synchronize and jaw clutch only one gear to a shaft; such a mechanism is disclosed in U.S. Pat. No. 3,221,851 which is incorporated herein by reference. Also, the number of retainers 112, pins 118, and assemblies 120 may be more or less than disclosed herein.

As is readily seen, friction members 94,114 and 96,116 pair up to define friction clutches for synchronizing the gears to the shaft prior to engagement of the jaw clutches. Cone clutches are preferred; however, other types of friction clutches may be used. Friction members 94,96 may be affixed to the associated gears in any of several known ways. Friction members 94,96 have internal cone friction surfaces 94a,96a which respectively mate with external cone friction surfaces 114a,116a. Members 94,96 and 114,116 also are respectively referred to as synchronizer cups and rings.

A wide range of cone angles may be used; cone angles of seven and one-half degrees are employed herein. The friction surfaces 114a,116a and/or 94a,96a may be defined by any of several known friction materials affixed to the base member; herein, pyrolytic carbon friction materials, such as disclosed in U.S. Pat. Nos. 4,700,823; 4,844,218; and 4,778,548, are preferred. These patents are incorporated herein by reference.

Pins 118 are shown in greater detail in FIG. 6. Each pin includes major diameter portions 118a having diameters slightly less than the diameter of flange openings 110c, a reduced diameter or groove portion 118b spaced between friction rings 114,116 (herein midway), conical blocker shoulders or surfaces 118c,118d extending radially outward from the pin axis and axially away from each other at angles herein of about forty degrees relative to a line normal to the pin axis, and preferably, but not necessarily, independent pre-energizer surfaces 118e,118f and extended secondary centering surfaces 118g,118h. The grooved portions, when disposed within their respective flange openings, allow limited rotation of the rigid friction ring and pin assembly relative to the flange to effect engagement of the pin blocker shoulders with chamfered blocker shoulders 110d,110e defined about the flange openings. The pre-energizer surfaces 118e,118f chordally intersect or remove a portion of conical blocker shoulders 118c,118d, are preferably (but not necessarily) flat planar surfaces and form angles relative to the pin axis which are somewhat less than the angles of the blocker surfaces. Centering surfaces 118g,118h are also flat planar surfaces and, as is readily apparent in the drawings, form angles relative to the pin axis which are substantially less than the angles of the blocker and pre-energizer surfaces. As disclosed herein, the chordal extents of the flat surfaces are tangent to circles concentric to the pin axis and the shaft axis. Axial forces provided by the secondary centering surfaces should be sufficient to return flange 110 to its neutral position in the event that such positioning has not been completely effected by the shift mechanism for moving the flange.

Plungers 124 are biased radially outward toward the pin pre-energizer and centering surfaces by the helical compression springs 122 disposed in slots 110f of the flange. The major extents of the slots preferably, but not necessarily, extend radially relative to the shaft axis. The slots also extend axially through the flange sides 110a,110b, into flange openings 110c, and have ends 110g at their radially inward extent for the springs to react against. The radially inner portion of the springs may be retained by unshown means such as pegs extending radially outward from the slot ends. Plungers 124, may be formed of a sheet metal material, but are preferably formed of a cast or compacted material such as steel to provide structural rigidly and surface hardness. Each plunger 124 has a somewhat U-shaped cross-section with a closed end defining a head portion having flat angled surfaces 124a,124b for cooperating with the flat pre-energizer and centering surfaces of the associated pins 118. The sidewalls of each plunger have surfaces 124c,124d for slidably cooperating with the radially extending sidewall surfaces of the slot 110f to retain the plunger in the circumferential direction. The plunger sidewalls also have surfaces 124e,124f for slidably cooperating with the axially facing, radially extending end surfaces 102a,104a of jaw members 102,104 to retain the plunger in the axial direction.

As previously mentioned, jaw members 102,104 include internal spline teeth 106,108 slidably mating with external spline teeth 29 affixed to the shaft. The external splines have involute flank surfaces 29i extending parallel to the shaft axis, and the mating thereof with flank surfaces of the jaw member splines prevents relative rotation therebetween. H-shaped members 112 each include end portions 112a,112b, which react against jaw member surfaces 102b,104b, and a center portion 112c which interconnects the end portions. The center portion extends snugly through axially extending slots 102c,104c in the jaw members and freely through openings 110h having radially extending stop surfaces 110n,110m which cooperate with center portion 112c to limit rotational movement of the flange relative to the jaw members and shaft for reasons explained herein after.

Figure 8:
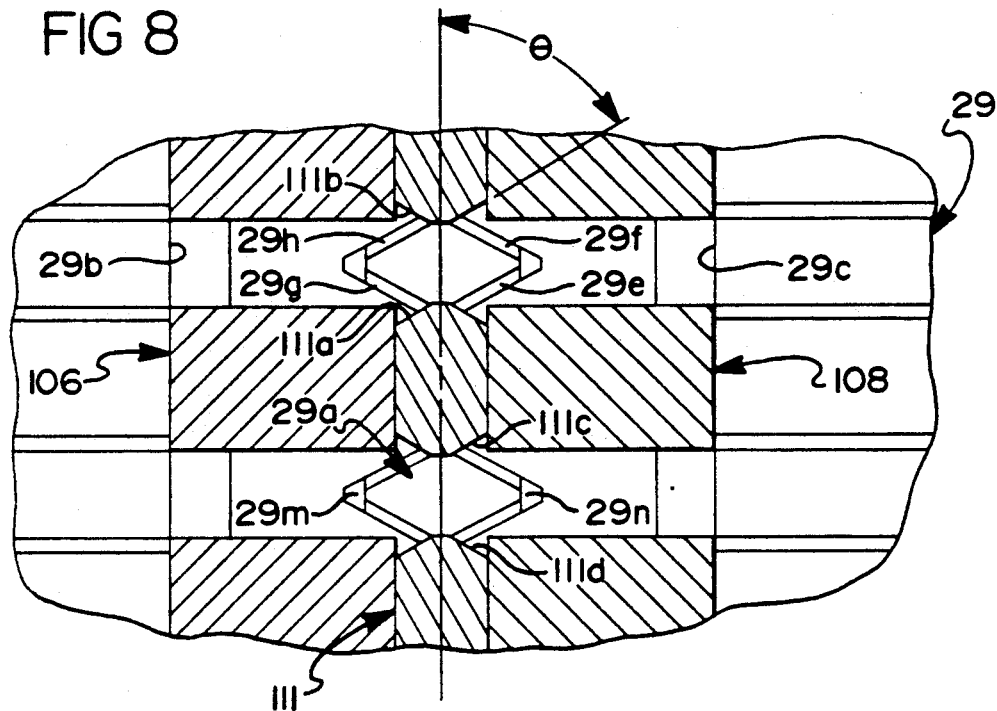
FIGS. 8 and 9 are sectional views of toothed portions of the mnechanism looking along line 8—8 of FIG. 2.

As best seen in FIGS. 2, 3 and 7-9, portions of external teeth 29 of the shaft in both axial directions from the FIGS. 1 and 8 neutral position of flange 110, are modified to provide one or more ramp surfaces which cooperate with a like number of ramp surfaces defined by reaction means or internal teeth 111 extending radially inward from flange 110 and into the axially extending spaces between shaft splines 29. The ramp surfaces allow limited rotation of the flange relative to jaw members 102,104 and shaft 28, and react synchronizing torque between the cone clutches and shaft to provide an additive axial self-energizing force for increasing the engaging force of the cone clutch initially engaged by a shift force applied to flange 110, thereby increasing the synchronizing torque provided by the cone clutch. Ramp surfaces may be provided for increasing synchronizing force for one or both gears and/or for increasing synchronizing force in response to torque in either direction, as is encountered for up and down shifts. More specifically, each tooth 29, circumferentially between each H-shaped retainer center portion 112c, has first and second axially spaced apart recesses defining annular grooves having first ends defined by a post-like portion 29a, axially opposite ends 29b,29c, and minimum outside diameters 29d. The minimum outside diameters 29d are greater than the root diameter of splines 29 and greater than the inside diameters 106a,108a of the jaw clutch splines 106,108. Also, the minimum outside diameters 29d are less than the inside diameters 111e of internal teeth 111. The post-like portion 29a has a diamond-shape, formed by removing portions of each tooth in both axial directions therefrom. The axial and radial extent of the removed portions are selected to facilitate ease of machining boost ramp surfaces 29e, 29f, 29g, 29h on post portion 29a and to minimize the effects such removal has relative to the strength of the teeth. Further, spline teeth 29 are provided with sufficient radial depth to ensure that the ramp surfaces have enough surface area to minimize wear due to forces acting thereon. The axial extent of the removed portions or recesses between axial ends 29m,29n of post portion 29a and axial ends 29b,29c of teeth 29 are formed by simply machining annular grooves in the teeth. The axial length of removed portion is sufficient to facilitate insertion of a machining tool to form the ramp surfaces. Ramp surfaces 29e,29f respectively react against ramp surfaces 111a,111b on flange teeth 111 to provide the additive axial forces to increase or assist the synchronization rate of gear 54 in response to torque in either direction. Ramp surfaces 29g,29h respectively react against ramp surfaces 111c,111d to provide the additive axial forces for gear 52 in response to synchronizing torque in either direction. The angles of the ramp surfaces may be varied to provide different amounts of additive axial force for up and down shifts and for high and low speed ratios. Also, if no additive axial force is preferred in one direction for one gear or more, the ramp surfaces may be parallel to the spline, i.e., no effective ramp surfaces are provided. The magnitude or amount of the axial additive forces, as explained further hereinafter, is also a function of the mean radii ratio of friction clutches and self-energizing ramps. Accordingly, the magnitude of the additive forces for a given shift force applied to shift flange 110 by a shift fork may be varied by varying the ramp angles and/or the mean radii ratio.

When the flange 110 is in the neutral position of FIGS. 1 and 8, reduced diameter portions 118b of pins 118 are radially aligned with their associated flange openings 110c, friction surfaces of the cone clutches are slightly spaced apart and are maintained in this spaced relation by angled pre-energizer surfaces 124a,124b of the plungers 124 acting on pre-energizer surfaces 118e,118f of pins 118 by the force of springs 122. The axial force provided by the pre-energizer surface is preferably sufficient to counter act any additive axial force on flange by the self-energizing ramps due to viscous shear of oil between the cone clutch surfaces. When it is desired to couple either gear to the shaft, an appropriate and unshown shift mechanism, such as disclosed in U.S. Pat. No. 4,920,815 and incorporated herein by reference, is connected to the outer periphery of flange 110 in known manner for moving the flange axially along the axis of shaft 28 either left to couple gear 52 or right to couple gear 54. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 110 in an axial direction and is represented by the length of arrow $F_o$ in FIG. 10.

Initial rightward axial movement of flange 110 by the operator shift force $F_o$ is transmitted to the pins by pre-energizer surfaces 118f,124b to effect initial frictional engagement of cone surface 116a with cone surface 96a. The initial engagement force of the cone surface is of course a function of the force of springs 122 and the angles of the pre-energizer surfaces. The initial frictional engagement (provided an asynchronous condition exists and momentarily ignoring the effect of the self-energizing ramps) produces an initial cone clutch engaging force and synchronizing torque $T_o$ which ensures limited relative rotation between flange 110 and the engaged friction ring, and hence, movement of the reduced diameter pin portions 118b to the appropriate sides of the flange openings 110c to provide engagement of pin blocker shoulders 118c with flange blocker shoulders 110d. When the blocker shoulders are engaged, the full operator shift force $F_o$ on flange 110 is transmitted to friction ring 116 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 10. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 110c to allow continued axial movement of the flange and engagement of the external jaw teeth 104d of jaw member 104 with internal jaw teeth 100a of jaw member 100, as shown in FIG. 7. As is known in the prior art and as is specified by reference numbers only for jaw teeth 98a of jaw member 98 in FIG. 7, the lead portions of the jaw teeth have rake leading edges 98b to reduce tooth damage during initial contact, and have chamfer or wedge faces 98c to clock the teeth into mating alignment. Jaw teeth with such lead portions are disclosed in greater detail in U.S. Pat. No. 4,246,993 which is incorporated herein by reference along with U.S. Pat. No. 3,265,173 which provides a teaching for the proper rake angles. The wedge faces, which may be asymmetric, prevent delay of shift completion due to abutting contact of the leading edges of the teeth. To facilitate smooth and relatively effortless completion of shifts, the jaw teeth are preferably as fine or small, as practicable, in the circumferential direction, thereby minimizing the number or rotational clocking degrees necessary to matingly align the jaw teeth. Also, the jaw teeth are preferably disposed about as large a diameter as is practicable.

Still ignoring the effects of the self-energizing ramps, cone clutch torque provided by the force $F_o$ is expressed by equation (1).

$$T_o = F_o R_c \mu_c / \sin \alpha \qquad (1)$$

where:
$R_c$ = the mean radius of the cone friction surface,
$\mu_c$ = the coefficient of friction of the cone friction surface, and
$\alpha$ = the angle of the cone friction surfaces.

Figure 9:
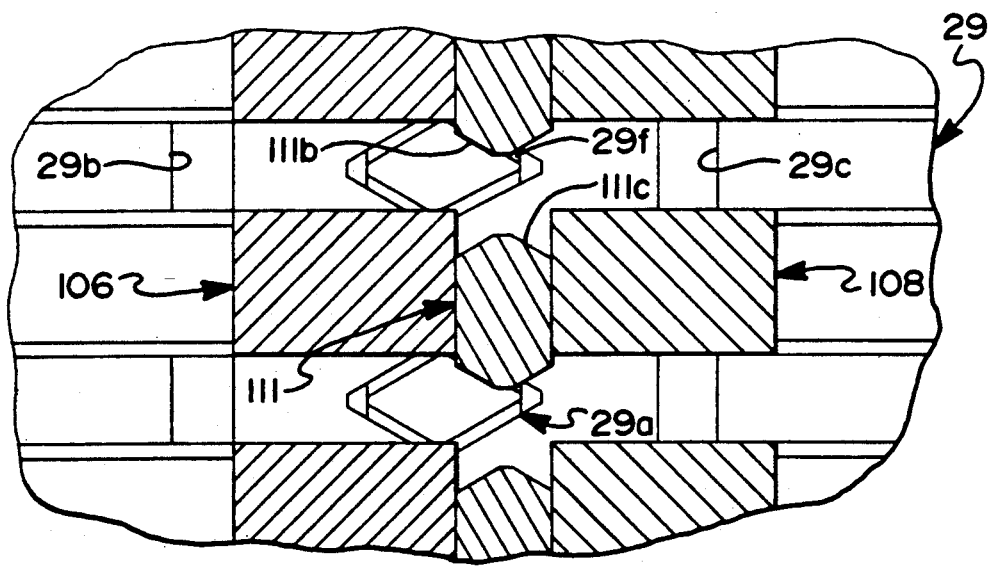

Looking now at the affects of the self-energizing ramps and referring particularly to FIGS. 8 and 9, the synchronizing torque $T_o$, due to the operator applied axial shift force $F_o$, is of course transmitted to flange 110 by pins 118 and is reacted to shaft 28 across the self-energizing ramp surfaces. The self-energizing ramp surfaces, when engaged, limit rotation of the flange relative to shaft 28 and jaw members 102,104, and produce an axial force component or axial additive force $F_a$ acting on the flange in the same direction as shift force $F_o$, thereby further increasing the engaging force of the cone clutch to provide an additive synchronizing torque $T_a$ which adds to the torque $T_o$. FIG. 8 illustrates the position of the self-energizing ramp surfaces and the position of the jaw member splines 106,108 to the shaft splines 29 while shift flange 110 is in the neutral position corresponding to the position of FIG. 2. FIG. 9 illustrates a position of the ramps and splines while gear 54 is being synchronized by engaged cone surfaces 96a,1-16a. The engaged cone surfaces are producing a synchronizing torque in a direction which has effected engagement of flange member ramp surfaces 111d with shaft ramp surfaces 29f. Hence, the sum of the axial forces for engaging the cone clutch are $F_o$ plus $F_a$ and the sum of the synchronizing torques being produced by the cone clutch are $T_o$ plus $T_a$, as graphically shown in FIG. 10. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to significantly increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected the force $F_a$ will rapidly and uncontrollably increase independent of the force $F_o$, thereby driving the cone clutch toward lockup. Self-locking rather than self-energizing decreases shift quality or shift feel, may over stress synchronizer components, may cause over heating and rapid wear of the cone clutch surfaces, and may even override operator movement of the shift lever.

The main variables for calculating self-energizing ramp angles $\theta$ and for providing additive axial forces $F_a$, which increase and decrease in proportion to operator forces $F_o$, are cone clutch angle $\alpha$, cone clutch coefficient of friction $\mu_c$, mean radii ratio $R_c$ of the cone clutch and $R_r$ of the self-energizing ramps, ramp coefficient of friction $\mu_r$, and pressure angle $\phi$ of the self-energizing ramps. The pressure angle $\phi$ may be zero. Herein, the ramps have a pressure angle of 20 degrees.

The total synchronizing torque $T_t$ produced by the cone clutch is:

$$T_t = F_t R_c \mu_c / \sin \alpha \qquad (2)$$

where
$$T_t = T_o + T_a \qquad (3)$$

and
$$F_t = F_o + F_a \qquad (4)$$

The equation for the axial additive force $F_a$, which is given without derivation, is $$F_a = F_{tan} \left[ \frac{\cos\theta - \mu_r \sin\theta/\cos\phi}{\sin\theta + \mu_r \cos\theta/\cos\phi} \right] \qquad (5)$$

where the ramp angle $\theta$ is measured from a plane normal to shaft axis 28a, and $F_{tan}$ acts on the ramps and is the tangential force component of torque $T_t$ at $R_r$. $T_t$ and $F_{tan}$ for one torque direction are respectfully represented by like referenced arrows in FIG. 3. Therefore, $$F_{tan} = T_t/R_r \quad (6)$$

Substituting equations (5) and (6) into equation (4) and solving for $F_t$ gives $$F_t = \frac{F_o}{1 - \left[\dfrac{\cos\theta - \mu_r\sin\theta/\cos\phi}{\sin\theta + \mu_r\cos\theta/\cos\phi}\right]\left[\dfrac{R_c\mu_c}{R_r\sin\alpha}\right]} \quad (7)$$

$F_t/F_o$ is defined as a boost or self-energizing ratio. The greater the boost ratio the greater the total synchronizer $T_t$ for a given operator force $F_o$. Boost ratios equal to one correspond to ramp angles $\theta$ of 90 degrees; such angles are parallel to the shaft splines and provide no self-energizing. As $\theta$ decreases, the boost ratio increases. Boost ratios from about 1:1 to 5:1 have been employed. However, boost ratios greater than 1:1 and less than 5:1 are preferred. $F_t/F_o$ tends to infinity as the denominator of equation (7) tends to zero. This of course occurs when the minus term in the denominator of equation (7) approaches one. Accordingly, the ramps are self-energizing and not self-locking when $$\left[\frac{\cos\theta - \mu_r\sin\theta/\cos\phi}{\sin\theta + \mu_r\cos\theta/\cos\phi}\right]\left[\frac{R_c\mu_c}{R_r\sin\alpha}\right] < 1 \quad (8)$$

For a given synchronizer geometry, equation (8) may be simplified by setting $R_c$, $\mu_c$, $R_r$, $\alpha$ equal to a constant $K$:

$$\frac{R_c\mu_c}{R_r\sin\alpha} = \frac{1}{K} \quad (9A)$$

OR $$\frac{R_r\sin\alpha}{R_c\mu_c} = K \quad (9B)$$

Substituting either of equations (9) into equation (8), re-arranging and solving for ramp angles $\theta$ gives equation (10) which provides minimum angles $\theta$. Such minimum angles produce self-energizing forces $F_a$ which are proportional to operator forces $F_o$, which provide maximum controllable boost ratios, and which are not self-locking.

$$\theta > \mathrm{TAN}^{-1}\left[\frac{1 - K\mu_r/\cos\phi}{K + \mu_r/\cos\phi}\right] \quad (10)$$

Keeping in mind that $\theta$ is measured from a plane normal to shaft axis 28a, increasing values of angles $\theta$ therefore provide decreasing values of forces $F_a$ and torque $T_a$, and of course decreasing values of torque $T_t$. Accordingly, as K increases, angles $\theta$ must decrease to prevent self-locking and to keep forces $F_a$ proportional to $F_o$, provided all other variables remain the same.

More specifically, to prevent self-locking and to keep forces $F_a$ proportional to $F_o$, minimum angles $\theta$ should increase:

as the mean radii ratio $R_c/R_r$ increases and/or,
as the cone angle $\alpha$ decreases and/or,
as the coefficient of clutch friction $\mu_c$ increases and/or,
as the ramp pressure angle $\phi$ increases and/or,
as the coefficient of ramp friction $\mu_r$ increases.

Also, when calculating minimum ramp angles for a so-called given geometry and a maximum desired boost ratio, a margin of safety is preferred to prevent self-locking or over boost due to manufacturing tolerances and due to normal wear of components.

Since self-energizing synchronizer mechanism 60 is substantially identical to mechanism 62, it will not be described. The range self-energizing synchronizer mechanism 84 utilizes substantially the same structure and function with respect to the self-energizing ramps but differs with respect to configuration of the pins and plungers for pre-energizing the cone clutches and for blocking asynchronous engagement of jaw clutches. Accordingly, the description of mechanism 84 will be limited to the pre-energizer and blocker feature therein.

The synchronizer mechanism 84 includes annular friction members 130, 132 and annular jaw clutch members 78a, 80a affixed to gears 74, 76, jaw clutch members 134, 136 having internal spline teeth 134a, 136a slidably mating with external spline teeth 82a integrally formed with shaft 82 or otherwise affixed thereto, a radially extending shift flange 138, having axially oppositely facing faces 138a, 138b sandwiched between axially facing surfaces 134b, 136b of jaw members 134, 136, three H-shaped retainer members 140 for securing the flange and jaw members against relative axial movement, annular friction members or rings 142, 144 each including a set of three circumferentially spaced apart pins 146, 148 extending rigidly and axially therefrom and through circumferentially spaced openings 138c, 138d in the flange, and three spring assemblies 150 each including a spring 152 and two plungers 154 which bias pins 146, 148 circumferentially in opposite directions.

The pins 146, 148 respectively include major diameter portions 146a, 148a having diameters slightly less than the diameter of their associated flange openings 138c, 138d, reduced diameter portions 146b, 148b, and conical blocker shoulders or surfaces 146c, 148c extending radially outward from the pin axes and axially toward the associated friction ring at angles herein of about forty degrees relative to a line normal to the pin axis. The reduced diameter portions, when disposed within their respective flange openings, allow limited rotation of the pins and associated friction ring relative to the flange to effect nonconcentric positioning of the pins in the openings for engagement of the pin blocker shoulders with chambered blocker shoulders 138e, 138f defined about the flange openings.

Figure 12:
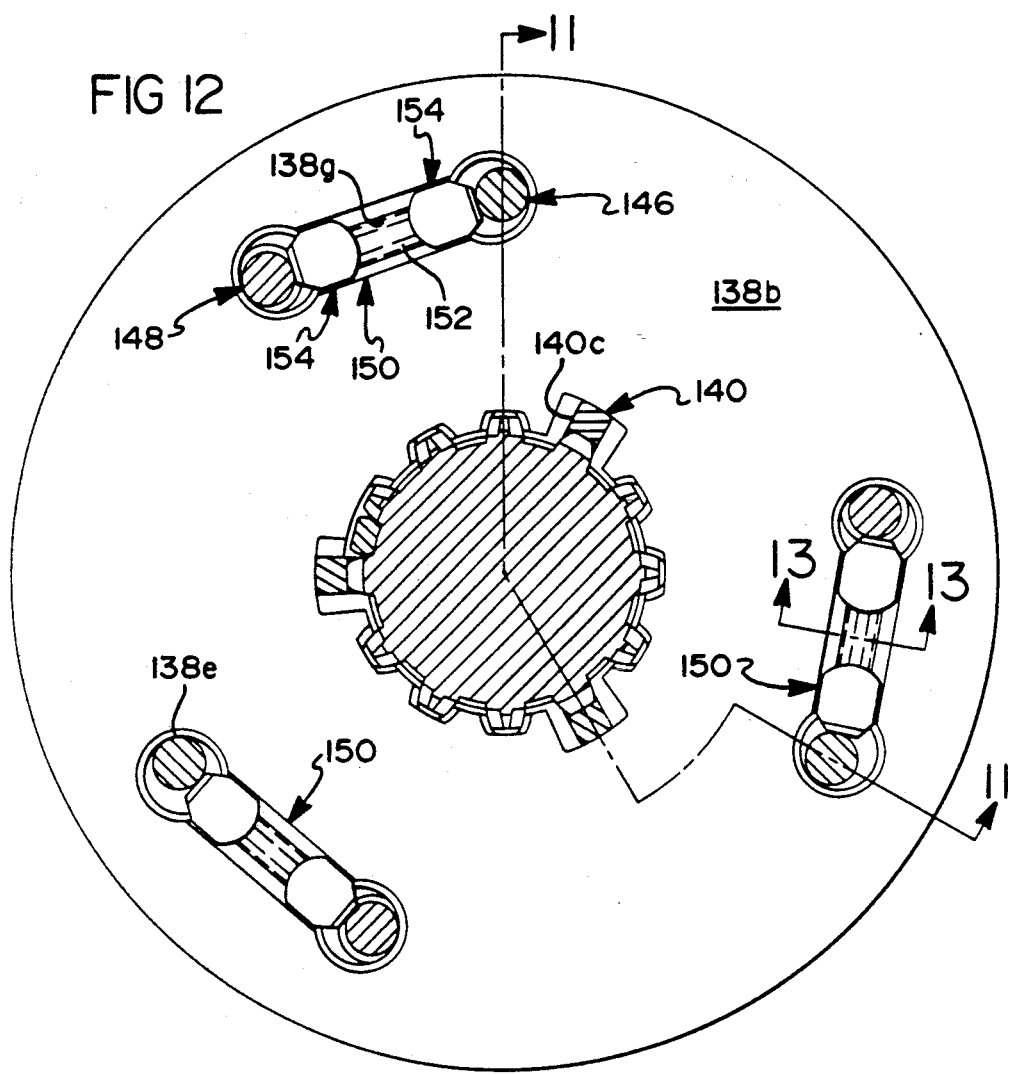
FIG. 12 is a partially sectioned view of the mechanism looking along line 12—12 of FIG. 11.
Figure 14A:
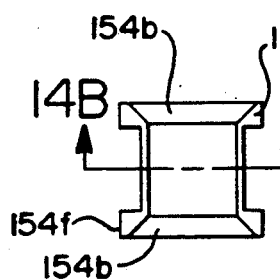
FIGS. 14A, 14B and 14C are detailed views of a plunger component in FIGS. 1 and 2.
Figure 14B:
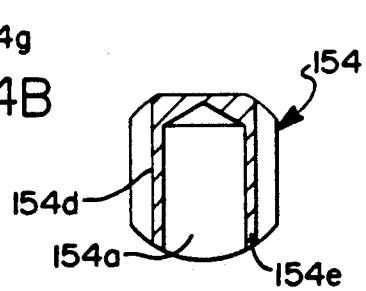
Figure 14C:
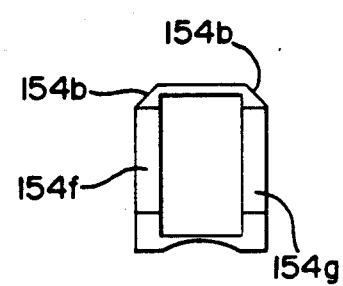

Referring now in greater detail to pins 146, 148 and spring assemblies 150 and mainly to FIGS. 12 and 13, each spring assembly 150 is disposed in a slot 138g extending axially through the axially opposite end faces 138a, 138b of the flange and having opposite ends opening into flange openings 138c, 138d. Plungers 154, which are shown in detail in FIGS. 14A, 14B, and 14C, may be formed of a sheet metal material, but are preferably formed of a cast or compacted material such as steel to provide structural rigidly and surface hardness. Each plunger includes a blind bore 154a receiving one end of the associated spring 152, and a head portion defining flat angled surfaces 154b, 154c which ride up the blocker shoulders when the major diameter portion of the associated pin enters the opening to complete a shift. Springs 152 are preferably of the helical compression type. The bore is bounded on its sides by sidewalls 154d, 154e which slidably cooperate with the slot walls and by sidewalls 154f, 154g which slidably embrace flange faces 138a, 138b or, as herein, guide grooves extending parallel to the slot for maintaining bind free alignment of the plungers in the grooves. Sidewalls 154f, 154g have a somewhat circular shape (FIG. 14B) of diameter less than flange openings 138c, 138d to facilitate assembly into the slots via the flange openings. With reference to FIG. 12, pins 146 are biased clockwise to the nonconcentric positions within openings 138c and pins 148 are biased counterclockwise to the nonconcentric positions within openings 138d. With such nonconcentric positioning and assuming counterclockwise rotation of gears 78, 80 and shafts 28, 82 when viewed from the right in FIG. 12, pin blocker shoulders 148c are aligned for engagement with flange blocker shoulder 138a whenever the synchronizer mechanism is upshifted by leftward actuation to connect gear 78 directly to shaft 82, and pin blocker shoulders 140c are aligned for engagement with flange blocker shoulders 138e, whenever the synchronizer mechanism is downshifted by rightward actuation to connect gear 78 to shaft 82. Via gears 74, 76 and 80.

Looking now at applications of self-energizing synchronizer mechanisms in a multi-ratio speed change transmission, as is known, the time required to synchronize a ratio gear decreases as the total synchronizing torque increases. Further, due to differences in reflected inertia, i.e., actual inertia of components being synchronized plus friction, the amount of work required to synchronize lower speed ratio gears is in general greater than that required for higher speed ratio gears. Also, the amount of work required to synchronize a given ratio gear for downshifts is in general greater than that required for upshifts. Further, the amount of work required to synchronize a given ratio gear increases in proportion to the amount of ratio change. Accordingly, since the ratio difference between range gears 78, 80 is substantially greater than the ratio difference between the main transmission section ratio gears, the work required to synchronize range gears 78, 80 is greater than the work required to synchronize the main transmission section ratio gears. Accordingly, when the synchronizer mechanisms disclosed herein are employed in a multi-ratio transmission, the synchronizer mechanisms for lower speed ratio gears are preferably provided with higher boost ratios and the mechanisms for higher speed ratios are preferably provided with lower boost ratios. Also, for a given ratio gear, the boost ratio for downshifts is preferably greater than for upshifts. By so arranging the boost ratios, substantially equal shift or synchronizing times can be provided for all ratio gears of a transmission provided with the self-energizing synchronizer mechanisms. For the synchronizer mechanisms disclosed herein, the boost ratios are readily varied by varying the cone clutch angles $a$, the radii ratio $R_c/R_r$, and the self-energizing ramp angles $\theta$.

Preferably, boost ratios for upshifts are less than boost ratios for downshifts, the boost ratios for the main transmission section decreases with decreasing speed reduction of the ratio gear (i.e., boost ratios of synchronizer mechanism 60 are less than the boost ratios of synchronizer mechanism 62), and the boost ratios of the range section synchronizer mechanism 84 are greater than the boost ratios of the transmission section synchronizer mechanism. By way of example only, the boost ratios of the main transmission section synchronizer mechanism may be in a range greater than 1:1 and less than 4:1, the boost ratios of the range section synchronizer mechanism may be in a range greater than 3:1 and less than 5:1.

As may be readily seen by reference to the drawings herein, flange 110 is disconnected from the torque path between shaft 28 and either of the ratio gears 52,54 when either of the jaw members 102, 104 are engaged with jaw members of the associated gear. Accordingly, the relatively small and wear sensitive self-energizing ramps are never exposed to the deteriorating effects of the full torque loads of the ratio gears. This is particularly important as the self-energizing ramps are moved radially inward since the forces acting on the ramps increase with decreasing ramp radius relative to shaft axis 28a.

Further, due to radius differences, forces acting between jaw member splines 106, 108 and shaft splines 29 are greater than the forces acting between the jaw clutch teeth. Accordingly, the axial length of the spline connection between jaw member splines 106, 108 and shaft splines 29 are preferably greater than what is necessary for adequate strength for the jaw clutch teeth. This greater axial spline length connection is inherent in the disclosed embodiment without lengthening the stroke of the shift mechanism which moves flange 110 since flange 110 is not circumferentially fixed to jaw clutch members 102, 104 or shaft 28; hence jaw member splines 106, 108 may continuously mate with shaft splines 29. This is particularly important when a vehicle operator moves the shift mechanism via a manually operated shift lever in known manner. An example of such a lever may be seen by reference to U.S. Pat. No. 3,850,047 which is incorporated herein by reference. Such levers are commonly of the first class lever type wherein increased shift stroke requires either increased operator movement of the shift lever (by change of the lever fulcrum) or decreased force applied to the shift mechanism for a given operator shift effort.

A preferred emobodiment of self-energizing synchronizer mechanism has been disclosed. Many variations and modifications of the preferred embodiment are believed to be within the spirit of the invention. The following claims are intended to cover the inventive portions of disclosed mechanism and variations and modifications believed to be within the spirit of the invention.

What is claimed is:

1. A pin-type synchronizer mechanism for a first gear secured against axial movement on a shaft having an axis about which the gear and shaft rotate relative to each other, the mechanism comprising:

first movable friction and jaw means respectively engagable with friction and jaw means affixed to the first gear for respectively synchronizing and positive connecting the first gear to the shaft in response to a shift force axially directed toward the first gear for moving a radially extending flange toward the first gear, means connecting the flange for axial movement with the first jaw means;

the shaft including a plurality of circumferentially spaced apart, axially extending spline teeth having flank surfaces slidably and continuously mating with flank surfaces of internal spline teeth of the movable jaw means, radially inner extents of the internal spline teeth defining an inside diameter thereof;

first and seocnd blocker means operative when engaged for preventing engagement of the jaw means prior to the synchronizing, the first blocker means defined by a plurality of circumferentially spaced pin-like means rigidly extending axially from the first friction means and into openings in the flange, the second blocker means defined about the openings;

pre-energizer means for engaging the friction means with an engaging force in response to initial axial movement of the flange by shift force from a neutral position toward the first gear, for engaging the blocker means in response to engagement of the friction means producing an initial synchronizing torque transmitted to the flange via the pin-like means and for transmitting the shift force to the first friction means via the blocker means to increase the engaging force of the friction means; characterized by:

the means connecting the flange and the flange including stop means for limiting circumferential movement of the flange relative to the first jaw means and shaft;

first recesses in the shaft splines defining an annular groove, the recesses having a minimum outside diameter greater than the inside diameter of the internal spline teeth of the movable jaw means, first common circumferentially facing flank surfaces of several of the shaft splines at one end of the recesses including first self-energizing ramp surfaces forming angles less than ninety degrees relative to a plane normal to the shaft axis; and several reaction means extending radially inward from the flange and received in spaces between the shaft splines at positions adjacent the first ramp surfaces, the reaction means having an inside diameter greater than the minimum outside diameter of shaft spline recesses, the reaction means including second self-energizing ramp surfaces for mating engagement with the first ramp surfaces in response to synchronizing torque in at least one direction from the engaged friction means associated with the first gear to produce an axial additive force on the flange in a direction of the shift force for increasing the engaging force of the friction means.

2. The synchronizing mechanism of claim 1, wherein:
a mean radii ratio of the friction means and the ramp surfaces are in the range of 1:1 to 4:1, and the angles of the ramp surfaces are in the range of 50-80 degrees relative to the plane.

3. The synchronizer mechanism of claim 1, wherein:
second circumferentially facing flank surfaces opposite the first flank surfaces of several of the shaft splines at the one end of the recesses including third sef-energizing ramp surfaces forming angles less than ninety degrees relative to the plane normal to the shaft axis; and the reaction means including fourth self-energizing ramp surfaces for mating engagement with the third ramp surfaces in response to synchronizing torque opposite the one direction from the engaged friction means associated with the first gear to produce the additive axial forces for increasing the engaging force of the friction means.

4. The synchronizing mechanism of claim 3, wherein:
a mean radii ratio of the friction means and the ramp surfaces are in the range of 1:1 to 4:1, and the angles of the ramp surfaces are in the range of 50-80 degrees relative to the plane.

5. The synchronizer mechanism of claim 3, wherein:
the angles of the ramp surfaces engaged by the synchronizing torque in the one direction are greater than the angles of the ramp surfaces engaged by the synchronizing torque in the direction opposite a one direction.

6. The synchronizing mechanism of claim 3, wherein:
the synchronizing torque in the one direction and the opposite direction respectively correspond to an upshift and a downshift respectively, into the first gear and the ramp angles of the ramp surfaces engaged by the synchronizing torque in the one direction being greater than the ramp angles of the ramp surfaces engaged by the synchronizer torque in the opposite direction.

7. A pin-type synchronizer mechanism for first and second axially spaced apart gears mounted for rotation and secured against axial movement on a shaft having an axis about which the gears and the shaft rotate, the mechanism comprising:

gear friction and jaw means affixed to each gear, the friction means engagable with first and second axially spaced apart and axially movable friction means for respectively synchronizing the first and second gears with the shaft, and the gear jaw means engagable with axially movable jaw means;

the shaft including a plurality of circumferentially spaced apart, axially extending, external spline teeth having flank surfaces slidably and continuously mating with the flank surfaces of internal spline teeth of the movable jaw means, radially inner extents of the internal spline teeth defining an inside diameter thereof;

a flange extending radially between the first and second movable friction means for axially moving the axially movable friction and jaw means into said engagement in response to an axially bi-directional shift force applied to the flange, means securing the flange against axial movement relative to the axially movable jaw means;

blocker means operative when engaged for preventing engagement of the jaw means prior to the synchronizing, the blocker means including a plurality of circumferentially spaced pins rigidly extending axially from the first and second movable friction means and into openings of the flange, each of the pins having axially spaced apart blocker shoulder engagable with blocker shoulders defined on opposite sides of the flange and about the associated opening;

pre-energizer means for engaging either one of the first and second friction movable means with an engaging force in response to initial axial movement of the flange by the shift force from a neutral position toward one of the gears, for engaging the blocker means in response to engagement of the friction means producing a synchronizing torque transmitted to the flange via the pins, and for transmitting the shift force to the engaged friction means via the engaged blocker means to increase the engaging force of the engaged friction means; characterized by;

the means securing the flange and the flange including stop means for limiting circumferential movement of the flange relative to the axially movable jaw means;

first and second axially spaced apart recesses in the shaft splines defining annular grooves separated by post-like portions of the shaft splines therebetween, the recesses having a minimum outside diameter greater than the inside diameter of the internal spline teeth of the movable jaw means, a first common circumferentially facing side of several of the post-like portions including first and second self-energizing ramp surfaces forming angles less than ninety degrees relative to a plane normal to the shaft axis;

several reaction means extending radially inward from the flange and received in spaces between the shaft splines at position adjacent the post-like portions, the reaction means having an inside diameter greater than the minimum outside diameter of shaft spline recesses, the reaction means including third and fourth self-energizing ramp surfaces respectively for mating engagement with the first and second ramp surfaces of the post-like portions in response to synchronizing torque in at least one direction from the engaged friction means respectively associated with the first and second gears to produce axial additive forces on the flange in a direction of the shift force for increasing the engaging force of the respective friction means.

8. The synchronizing mechanism of claim 7, wherein:
mean radii ratio of the friction means and the ramp surfaces are in the range of 1:1 to 4:1 and the angles of the ramp surfaces are in the range of 50-80 degrees relative to the plane.

9. The synchronizing mechanism of claim 7, wherein:
second circumferentially facing sides opposite the first side of the several post-like portions including fifth and sixth self-energizing ramp surfaces forming angles less than ninety degrees relative to the plane normal to the shaft axis; and the reaction means including seventh and eighth self-energizing ramp surfaces respectively for mating engagement with the fifth and sixth ramp surfaces of the post-like portions in response to synchronizing torque opposite the one direction from the engaged friction means respectively associated with the first and second gears to produce the additive axial forces for increasing the engaging force of the respective friction means.

10. The synchronizer mechanism of claim 9, wherein:
the angle of the ramp surfaces engaged by the synchronizing torque in the one direction are greater than the angels of the ramp surfaces engaged by the synchronizing torque in the direction opposite a one direction.

11. The synchronizing mechanism of claim 10, wherein:
the synchronizing torque in the one direction and the opposite direction respectively corresponding to an upshift and downshift into the first and second gears and the ramp angles of the ramp surfaces engaged by the synchronizing torque in the one direction being greater than the ramp angles of the ramp surfaces engaged by the synchronizing torque in the other direction.

12. The synchronizing mechanism of claim 7, wherein:
the first gear provides a lower speed ratio than the second gear; and
the ramp angles associated with the first gear have a greater angle relative to the plane than do the ramp angles associated with the second gear.

* * * * *